Sept. 11, 1945. T. L. THURLOW 2,384,507
OBSERVATION INSTRUMENT
Filed April 11, 1944 2 Sheets-Sheet 1

INVENTOR
THOMAS L. THURLOW
BY
ATTORNEYS

Sept. 11, 1945. T. L. THURLOW 2,384,507
OBSERVATION INSTRUMENT
Filed April 11, 1944 2 Sheets-Sheet 2
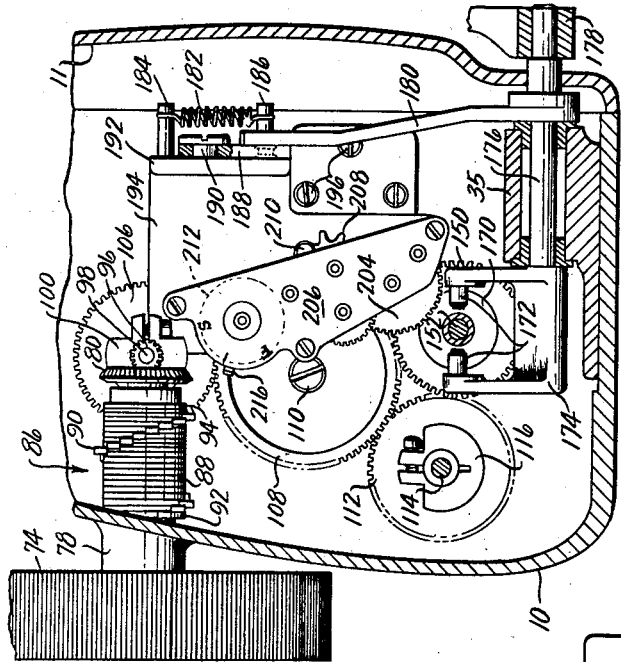
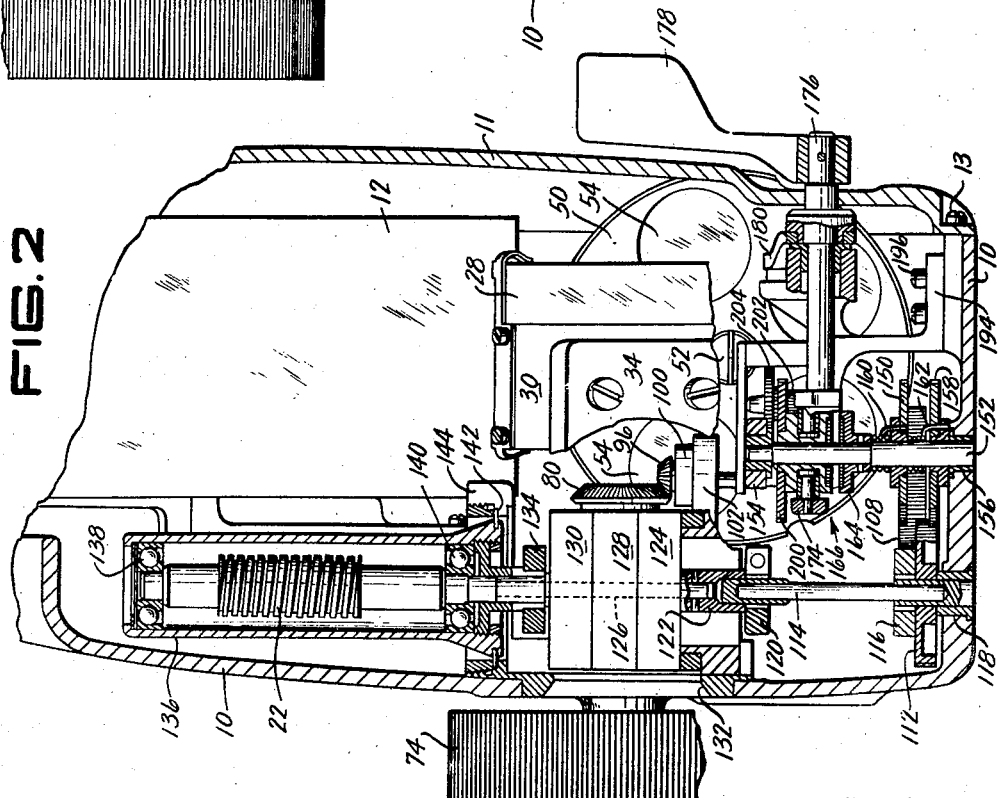
INVENTOR
THOMAS L. THURLOW
BY
ATTORNEYS Patented Sept. 11, 1945

2,384,507

UNITED STATES PATENT OFFICE 2,384,507

OBSERVATION INSTRUMENT

Thomas L. Thurlow, Venice, Calif.

Application April 11, 1944, Serial No. 530,565

25 Claims. (Cl. 88—2.4)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device for facilitating the taking of accurate readings from an observation instrument, and more particularly, to a device for limiting the rapidity with which the adjusting screw or knob of the instrument may be manipulated for the purpose of obtaining a reading therefrom.

Reference is made to my copending application Serial No. 530,566 filed April 11, 1944, and entitled Horizontal reference means for sextants and the like, which claims certain features of the invention herein shown and described but which are not encompassed within the scope of the claims appended hereto.

In the earlier forms of sextants it was customary to use the earth's horizon as a reference from which to measure the altitude of the various celestial bodies. This method was not entirely satisfactory, however, since under unfavorable weather conditions it was impossible for the observer to see the horizon. This type of sextant was also unsuited for use in aircraft since an error was introduced into the sextant reading due to the elevation of the aircraft above the earth's surface. In order to overcome this difficulty a new type of sextant was devised which incorporated an artificial horizon within the instrument itself, thereby eliminating the need for sighting on the actual horizon of the earth. The artificial horizon, however, was subject to acceleration errors and it therefore became necessary to provide means for minimizing this error. Accordingly, various averaging and integrating structures have been designed in an attempt to reduce the acceleration error to a tolerable figure. While the structures so designed have been successful in materially reducing the errors introduced into the reading on account of the effect of acceleration on the artificial horizon, at the same time they have slowed down the operation of taking a reading and have greatly increased the cost of the instrument.

Accordingly it is an object of the present invention to provide a simple and expeditious means for obtaining an accurate reading from an observation instrument in which either the object being observed or the point of reference is constantly moving about a medial point.

Another object of the invention is to provide a simple and expeditious means for reducing the error caused in the reading of an artificial horizon type of sextant by reason of the effect of acceleration upon the horizontal reference.

A further object of the invention is to provide a means for limiting the rapidity with which the index mirror of an artificial horizon type of sextant may be manipulated.

Still a further object of the invention is to provide an escapement brake on an artificial horizon type of sextant for limiting the speed with which the index mirror may be rotated where a reading is being taken.

Additional objects of the invention will become apparent from the accompanying detailed description and from the claims appended at the end thereof.

In the drawings: Fig. 1 is a sectional side elevation of a sextant incorporating the present invention.

Fig. 2 is a sectional front elevation of a portion of the sextant shown in Fig. 1.

Fig. 3 is a fragmentary plan view of the sextant shown in Fig. 1 with certain parts removed so as to more clearly show the escapement type of brake used in the present embodiment of the invention.

Figure 1:
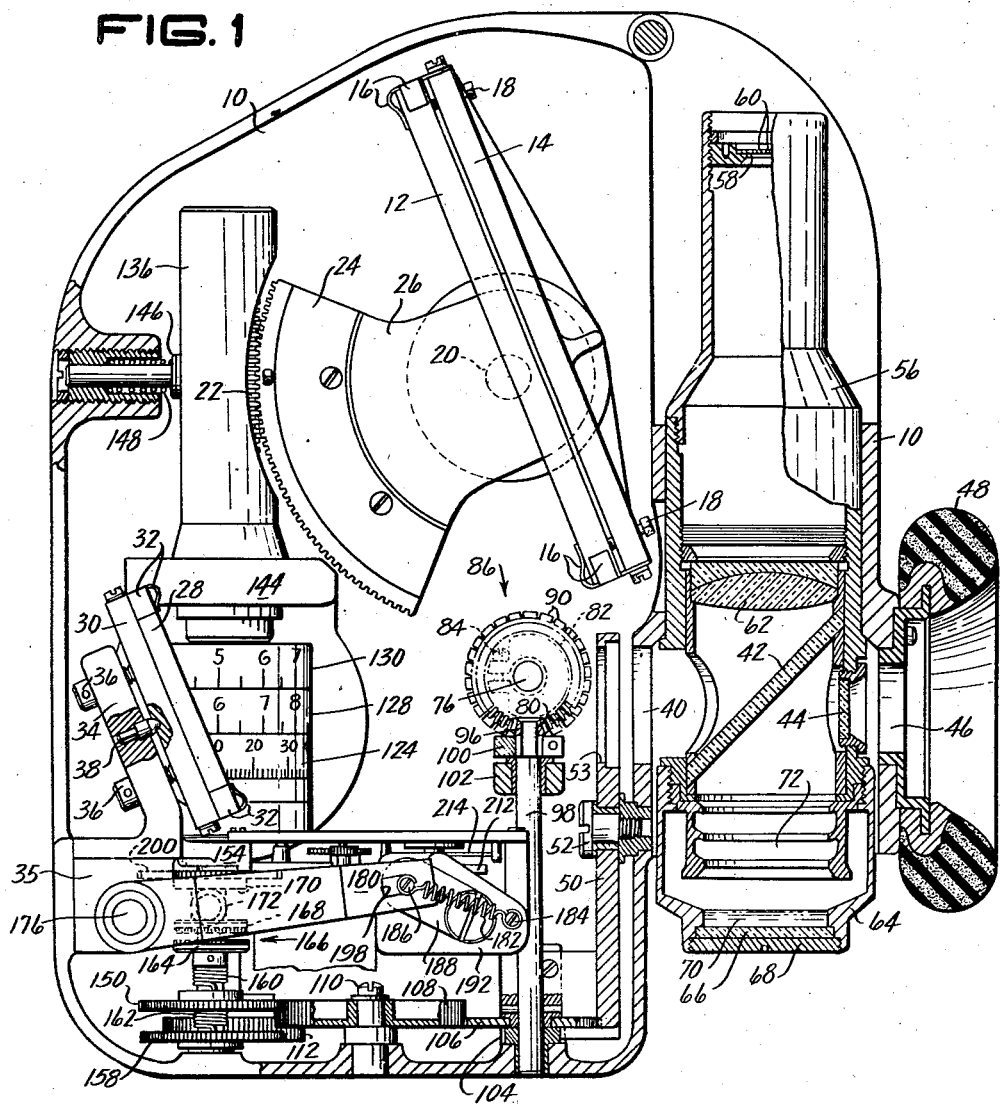

As shown in Fig. 1, the sextant comprises a frame 10 which serves to support and protect the various component parts of the instrument. This frame constitutes the right side, bottom and back of the instrument, the left-hand side being enclosed by a cover plate 11 (see Fig. 2) which is secured to the frame 10 by screws 13. The front and top of the instrument are left uncovered so as to leave the index mirror exposed to light coming from the front or from overhead. Suitable handgrips (not shown) are secured to the side of the frame 10 and to the side of the cover plate 11 so as to enable the observer to hold the instrument with both hands while making an observation. An index mirror 12 is secured to a rotatable supporting frame 14 by means of spring clips 16. The position of the mirror on the supporting frame may be adjusted with a high degree of precision by means of the screws 18 which are threaded into the frame 14 and bear against the underside of the mirror 12. The frame 14 is provided with a stub shaft 20 which is journaled in suitable bearings located in the sextant frame 10. The index mirror is rotatable on the stub shaft 20 by means of a worm 22 which engages a gear sector 24 secured to an arm 26 which is formed integrally with the mirror supporting frame 14.

A horizon glass 28, which in this instance consists of a completely silvered mirror, is secured to a supporting frame 30 by means of spring clips 32. The frame 30 is in turn adjustably secured to an upstanding portion 34 of a stationary bracket 35 by means of two screws 36 and a fulcrum pin 38.

The ray of light from the star or other celestial body is reflected from the horizon glass in a horizontal direction so as to pass through an aperture 40 provided in the rear wall of the frame 10, and then through an inclined glass plate 42 and an objective glass 44, after which it emerges from the instrument through an aperture 46 provided in a rubber-cushioned eyepiece 48 which is secured to the frame 10. Between the horizon glass 28 and the aperture 40 is a disk 50 which is rotatably mounted on a shouldered screw 52 secured to the rear wall of the frame 10. The disk is provided with a series of apertures 53, one of which is left open and the remainder of which are covered by filter glasses 54 of different shades and densities for viewing the various types of celestial bodies. By rotating the disk 50 on the screw 52 any one of the various apertures 52 may be brought into position in front of the aperture 40 so as to suitably filter the ray of light emanating from the celestial body.

The present sextant makes use of a novel type of artificial horizon which forms the subject matter of my aforementioned copending application. Since the present invention is not limited to use with the particular type of artificial horizon shown herein, but may be used with any type of artificial horizon which is subject to acceleration errors, it will be sufficient for the present purpose to describe only as much of this part of the structure as is necessary for a complete understanding of the invention.

Secured to the frame 10 at the rear of the instrument is a collimator tube 56 which is closed at the upper end by a thin metal diaphragm 58. The diaphragm 58 is suitably pierced to provide two short parallel slits 60 therein through which light from above the instrument may enter the collimator tube 56. The light passing through the slits is collimated by the lens 62 after which it passes through the inclined glass plate 42 and proceeds on downwardly toward the bottom of the collimator tube. On the lower end of the tube 56 is secured a liquid cell 64, the bottom of which is closed by a circular mirror 66 held in place by a closure plug 68. The upper surface of the mirror is covered to a depth of approximately five millimeters with a clear colorless liquid 70 having an index of refraction of 1.5. The liquid is prevented from running out of the cell 64 when the sextant is tilted from side to side or turned upside down by means of a trap 72 located on the inside of the cell. The collimated light from the slits 60 passes downwardly through the liquid 70 and strikes the silvered surface of the mirror 66, after which it is reflected back up through the liquid and into the collimating tube 56. The ray of light then strikes the under side of the inclined glass plate 42 and is reflected out of the tube 56 through the objective glass 44 and the eyepiece aperture 46. The liquid 70 contained in the bottom of the cell 64 causes the rays of light from the slits 60 to emerge from the eyepiece 48 in a horizontal direction even though the sextant be tilted slightly forward or backward from the vertical. This is due to the fact that the liquid assumes a wedge-shaped cross-section when the instrument is tilted away from the vertical and, if the index of refraction of the liquid is 1.5, the wedge thus formed will refract the incoming ray by just the proper amount to maintain the emergent ray horizontal. In this way, the image of the slits will always tend to remain in coincidence with the image of the celestial body even though the sextant be inadvertently tilted by the observer.

The sextant herein shown and described is primarily intended for use on board aircraft and will therefore be subject to all of the accelerations to which the aircraft itself is subjected. Such accelerations will cause the liquid 70 to pile up on one side or the other of the cell 64 and thus cause an unwanted deviation of the artificial horizon image. In other words, if the observer has the image of the two slits superimposed upon the image of the celestial body when the aircraft is flying at constant velocity, any change in the velocity of the aircraft will cause a change in the shape of the liquid wedge and hence cause the image of the slits to move away from the image of the celestial body. Inasmuch as it is impossible for the observer to tell when the velocity of the aircraft is constant and when it is changing, his only recourse is to take a number of readings from the instrument and to then obtain the mean thereof which, according to the law of probabilities, should reprsent the true altitude of the celestial body.

In the present device a novel mechanism is provided for obtaining an accurate reading from the sextant. As shown in Fig. 3, a milled handwheel 74 is secured to one end of a shaft 76 (see Fig. 1) which is journaled in a boss 78 formed on the sidewall of the frame 10. The handwheel 74 is located on the outside of the frame in close proximity to the right handgrip of the sextant (not shown) so that the wheel may be manipulated by the thumb and fingers of the observer's right hand at the same time that the grip is being held with this hand.

A bevel gear 80 is mounted on the inner end of the shaft 76 by means of a clamping collar 82, which is secured to the gear 80. The degree of tightness with which the collar grips the shaft 76 may be adjusted by tightening or loosening a screw 84 provided in the collar. By means of this construction, a slip-clutch arrangement is provided between the handwheel and the gear; i. e., the amount of torque which can be applied to the gear by the handwheel is limited to a definite amount after which the gear will merely slip on the shaft.

A limit stop 86 is provided on the shaft 76 between the inside wall of the frame 10 and the face of the bevel gear 80 for limiting the number of revolutions through which the handwheel may be turned in either direction. This stop consists of a number of disks or washers 88 each bearing an ear 90 which is swaged over at its outer end so as to overlap the ear on the next disk to the left as viewed in Fig. 3. The leftmost disk 92 is rigidly secured to the frame 10 and the rightmost disk 94 is rigidly secured to the shaft 76, while the intermediate disks are freely rotatable on the shaft 76. By means of this arrangement, the handwheel 74 may turn through approximately as many revolutions from one l'mit to the other as there are free disks 88.

Meshing with the bevel gear 80 is a small bevel gear 96 rigidly secured to the upper end of a vertical shaft 98 by means of a clamping collar 100. The shaft 98 is journaled at its upper end in a bracket 102 secured to the frame 10 and at its lower end in a bushing 104 mounted in the bottom wall of the frame 10. A gear 106 is pinned to the lower end of the shaft 98 and meshes with a wide-faced gear 108, which is rotatably mounted on a shouldered screw 110 fastened to the bottom wall of the frame. The gear 108 meshes with another wide-faced gear 112 which is rigidly secured to a vertical shaft 114 by means of a clamping collar 116. The lower end of the shaft 114 is journaled in a bushing 118 mounted in the bottom wall of the frame 10 while the upper end of the shaft is secured by a clamping collar 120 to the lower end of a hub 122 of a "minutes" counter drum 124. A second vertical shaft 126, which is located in vertical alignment with the shaft 114 is pinned at its lower end to the hub 122. Since the "minutes" counter drum is firmly secured to the shaft 114 it will be constrained to revolve at the same speed as this shaft. The registering mechanism of the sextant also includes a "degrees" counter drum 128 and a "tens of degrees" counter drum 130, which two drums are rotated by the shaft 126 at a reduced speed by means of suitable internal gearing (not shown). As shown in Fig. 1, the "minutes" drum is marked off with two series of graduations each extending from 0 to 60. Hence, one-half of a revolution of this drum is equal to one degree of altitude. The "degrees" drum is marked off with the numbers from one to ten, as is also the "tens of degrees" drum. Accordingly, the drum 128 is arranged to rotate through one complete revolution for every five rotations of the drum 124, while the drum 130 will turn through one revolution for every ten revolutions of the drum 128 or fifty revolutions of the drum 124. The altitude of the celestial body being observed may be read off of the drums 124, 128 and 130 after the observation has been completed by virtue of the counter drum viewing window 132 provided in the side wall of the frame 10.

The upper end of the shaft 126 is firmly secured to the lower end of the worm 22 by means of a clamping collar 134. The worm is mounted for rotation within a tube 136 by means of two ball bearings 138 and 140 mounted on the inside of the tube. The tube is flexibly attached at its lower end to the sextant frame by means of a thin washer 142, whose inner annulus is secured to the bottom of the tube 136 and whose outer annulus is clamped in the ring 144 which is secured to the frame 10. The teeth of the sector 24 are constantly maintained in close contact with the worm by means of a spring pressed plunger 146 which is supported in the frame 10 and is pressed against the outer surface of the tube 136 by the spring 148.

It will be apparent from the foregoing that manipulation of the handwheel 74 will cause the index mirror 12 to be rotated about its axis 20, this result being effected by the gear train 80, 96, 106, 112, 22 and 24. It will also be apparent that the position of the mirror 12, or, in other words, the altitude of the celestial body, may be read off directly from the several counter drums of the register through the viewing window 132. It is also to be noted that the rotation of the mirror in either direction is limited by the limit stop 86 so as to prevent the teeth of the sector 24 from becoming disengaged from the thread of the worm 22.

Coming now to the novel feature of the present invention, a means is provided in the sextant herein shown and described for limiting the rate at which the mirror 12 may be rotated by the handwheel 74, this means taking the form of an escapement mechanism in the present embodiment of the invention. As shown in Figs. 1 and 3, the wide-faced gear 108 meshes with the upper edge of the gear 112 and also with another gear 150 which is freely rotatable on a vertical shaft 152. The shaft 152 is journaled at its upper end in a projection 154 extending from the bracket 35 and at its lower end in a bushing 156 inserted in the bottom wall of the frame 10. Another gear 158, similar to the gear 150, is loosely mounted on the shaft 152 directly below the gear 150 so as to mesh with the wide-faced gear 112. By virtue of this arrangement, the two gears 150 and 158 will be rotated at equal speeds but in opposite directions. Two coil-grip friction clutches 160 and 162 encircle the shaft 152, the clutch 160 having its lower end connected to the gear 150 and the clutch 162 having its lower end connected to the gear 158. Both clutches 160 and 162 are wrapped in the same direction about the shaft 152 so that they will alternate in driving the shaft 152; i. e., when the gears 108 and 112 are rotating in one direction, the element 160 will slip on the shaft while the element 162 will seize the shaft and drive it, whereas, when the gears 108 and 112 are rotating in the opposite direction, the element 162 will slip on the shaft and the element 160 will seize the shaft and drive it. In this way, the shaft 152 will always be driven in the same direction regardless of the direction of motion of the handwheel 74.

Secured to the shaft 152 above the gears 150 and 158 is the lower element 164 of a dog clutch 166. The upper element 168 of the clutch is freely rotatable on the shaft and is provided with an annular groove 170 which is engaged by a pair of pins 172 fastened to the arms of a yoke 174. This yoke is secured to one end of a shaft 176, which is journaled in the bracket 35. The clutch element 168 may be moved up or down on the shaft 152 by means of a thumb lever 178 secured to the shaft 176 on the outside of the cover plate 11. A rearwardly extending arm 180 is secured to the shaft 176 just inside of the cover plate 11 for the purpose of retaining the yoke in either its raised or its lowered position. This is accomplished by means of a snap-over spring 182, which is secured at one end to a stationary stud 184 and at the other end to a stud 186 projecting from one end of a swinging link 188. The other end of the link 188 is freely pivoted on a shouldered screw 190 (see Fig. 3) which is threaded into a vertical extension 192 of a bracket 194 which is secured to the bottom wall of the frame 10 by means of screws 196. The stud 186 projects through a slot 198 formed in the rear end of the arm 180, thereby tending to move the arm 180, shaft 176 and yoke 174 to one or the other of two extreme positions.

Rigidly secured to the upper element 168 of the dog clutch 166 is a gear 200 which meshes with a wide-faced pinion gear 202 (see Fig. 2). Secured to the gear 202 is a larger gear 204 (see Fig. 3) which serves to drive a conventional escapement mechanism 206 having an escapement wheel 208, a lever 210, a balance wheel 212, a balance spring 214 and a regulating lever 216. The escapement mechanism and the gearing connecting the same to the shaft 152 is so constructed and arranged as to limit the rate of rotation of the mirror 12 to approximately 45 minutes of altitude per minute. In order to facilitate the initial adjustment of the instrument, the escapement mechanism may be disengaged from the gear train connecting the handwheel 74 with the mirror 12 by lifting the thumb lever 178.

The operation of the device is as follows:

When a sight is to be taken on the sun or some other celestial body, the filter disk 50 is rotated so as to bring an appropriate filter glass 54 in front of the aperture 40. The thumb lever 178 is then lifted so as to disengage the clutch 166 and the observer, holding the instrument in both hands by means of the handgrips located on either side of the instrument, rotates the handwheel 74 until an approximate coincidence between the image of the celestial body and the image of the slits 60 is observed through the eyepiece 48. The thumb lever 178 is then pressed down so as to engage the clutch 166 and hence bring the escapement mechanism 206 into play. The observer then attempts to maintain the two bright lines of light formed by the slits 60 superimposed upon the image of the celestial body by rotating the handwheel 74 backward or forward as the need may arise. By virtue of the operation of the escapement mechanism, the observer will be unable to rotate the index mirror rapidly enough to follow the deviation between the two images caused by acceleration effects on the fluid 70 so that the correction applied will always remain "inside" of the actual deviations. In a sense, this amounts to an integration of all of the deviations since the angle through which the mirror is rotated for any given deviation is dependent upon the length of time for which the deviation persists. In other words, the longer a deviation persists, the further the mirror will be rotated in that direction by the operator of the instrument. This procedure is followed until the oscillations of the slits settle down to an equal number of deviations on each side of the image of the celestial body per unit of time. The observer then lowers the sextant and notes the reading of the register through the window 132 and also the time. Using this data, the observer's position on the earth's surface may then be computed in the usual manner.

Having thus described my invention in conjunction with a preferred embodiment thereof, what I claim as new and desire to secure by Letters Patent is:

1. An observation instrument for determining the position of an object with respect to a predetermined reference point when relative motion of an oscillatory nature exists between the object and the reference point, said instrument comprising an eyepiece for viewing an object, reference means providing a reference point viewable in said eyepiece, optical means including a manipulable index member for enabling the image of the object and the image of the reference point to be simultaneously viewed in a superimposed relationship through said eyepiece, means for indicating the position of said index member, and means for limiting the speed of movement of said index member to a speed less than the speed of relative motion between the object sighted and the reference point so as to enable an accurate reading therefrom to be rapidly obtained.

2. The invention as defined in claim 1 wherein said limiting means comprises an escapement mechanism operatively connected to said index member.

3. In a celestial navigation instrument adapted for determining the position of an object with respect to a predetermined reference point when relative motion of an oscillatory nature exists between the object and the reference point, said instrument having a rotatable index mirror, a horizon glass, and an artificial horizon, the combination of means for enabling an observer to simultaneously view the image of the celestial body and the image of the artificial horizon, manipulable means for rotating said index mirror so as to enable the image of the celestial body to be brought into a superimposed relationship with respect to the image of the artificial horizon, and means operatively connected with said manipulable means for limiting the speed with which said index mirror may be rotated to a speed less than the speed of relative motion between the object sighted and the reference point.

4. The invention as defined in claim 3 wherein said limiting means comprises an escapement mechanism.

5. In a celestial navigation instrument adapted for determining the position of an object with respect to a predetermined reference point when relative motion of an oscillatory nature exists between the object and the reference point, said instrument having a rotatable index mirror, a horizon glass, an artificial horizon, and an eyepiece for enabling an observer to simultaneously view the image of the celestial body and the image of the artificial horizon, a manipulable member for rotating said index mirror so as to enable the image of the celestial body to be brought into a superimposed relationship with respect to the image of the artificial horizon as viewed through said eyepiece, an escapement mechanism engageable with said manipulatable member to limit the speed of movement of said index member to a predetermined rate of speed less than the speed of relative motion between the object sighted and the reference point, and a clutch mechanism for selectively engaging said escapement mechanism with said manipulable member so as to limit the speed with which said index mirror may be rotated.

6. The invention as defined in claim 5 wherein a registering mechanism is operatively connected with said index mirror for indicating the angular position of the same.

7. A sextant adapted for determining the position of an object with respect to a predetermined reference point when relative motion of an oscillatory nature exists between the object and the reference point, said sextant comprising an index mirror, a manipulable means for rotating said index mirror, and an escapement mechanism operatively connected with said manipulable means for limiting the speed of rotation of said index mirror to a predetermined rate of speed less than the speed of relative motion between the object sighted and the reference point.

8. The invention as defined in claim 7 wherein means is provided for selectively disconnecting said escapement mechanism from said manipulable means.

9. The invention as defined in claim 7 wherein a registering mechanism is operatively connected with said index mirror for continuously indicating the angular position of the same.

10. In a sextant adapted for determining the position of an object with respect to a predetermined reference point when relative motion of an oscillatory nature exists between the object and the reference point, said sextant having a rotatable index mirror, an artificial horizon, and an optical system for enabling the image of the body being observed and the image of the artificial horizon to be simultaneously viewed by the user of the instrument, the combination of a handwheel, a gear train operatively connecting said handwheel with said index mirror, an escapement mechanism engageable with said gear train to limit the speed of movement of said index member to a predetermined rate of speed less than the speed of relative motion between the object sighted and the reference point, and means for selectively engaging said escapement mechanism with said gear train to thereby limit the speed with which said index mirror may be rotated by said handwheel.

11. The invention as defined in claim 10 wherein a register is operatively connected with said gear train so as to continuously indicate the angular position of said index mirror.

12. The invention as defined in claim 10 wherein means is provided for causing said escapement mechanism to always be driven in the same direction regardless of the direction of rotation of said handwheel.

13. The invention as defined in claim 10 wherein means is provided between said handwheel and said gear train for limiting the amount of torque which may be applied to said gear train through said handwheel.

14. An observation device adapted for determining the position of an object with reference to a predetermined reference point when relative motion of an oscillatory nature exists between the object and the reference point, said device comprising sighting means for viewing an object, reference means providing a reference point viewable in said sighting means in relation to the object sighted, a manipulatable index member for indicating the angle of said object with respect to said reference point, and means for limiting the speed with which said index member may be operated to a speed less than the speed of relative motion between the object sighted and the reference point.

15. An observation device adapted for determining the position of an object with respect to a predetermined reference point when relative motion of an oscillatory nature exists between the object and the reference point, said device comprising sighting means for viewing an object, reference means providing a reference point viewable in said sighting means in relation to the object sighted, a manipulatable index member for indicating the angle of said object with respect to said reference point, and means for limiting the speed with which said index member can be operated to a predetermined rate of speed less than the speed of relative motion between the object sighted and the reference point.

16. An observation device adapted for determining the position of an object with respect to a predetermined reference point, said device comprising sighting means for viewing an object, reference means providing a reference point viewable in said sighting means in relation to the object sighted, manipulative means for making an observation measurement, said manipulative means including a manipulatable index member for measuring the angle of said object with respect to said reference point, a register operable by said manipulative means for numerically indicating the result of the observation measurement, and means for limiting the speed with which said index member may be manipulated to a speed less than the speed of relative motion between the object sighted and the reference point.

17. The invention as defined in claim 16 wherein said limiting means includes an escapement mechanism.

18. An observation device adapted for determining the position of an object with respect to a predetermined reference point, said device comprising sighting means for viewing an object, reference means providing a reference point viewable in said sighting means in relation to the object sighted, manipulative means for making an observation measurement, said manipulative means including a manipulatable index member for indicating the angle of said object with respect to said reference point, an escapement mechanism cooperable with said manipulative means for limiting the speed of movement of said index member to a predetermined rate of speed less than the speed of relative motion between the object sighted and the reference point, and a clutch for selectively engaging said escapement mechanism with said manipulative means to thereby limit the speed with which said index member may be manipulated.

19. An observation device adapted for determining the position of an object with respect to a predetermined reference point when relative motion of an oscillatory nature exists between the object and the reference point, said device comprising sighting means for viewing an object, reference means providing a reference point viewable in said sighting means in relation to the object sighted, manipulative means for making an observation measurement, said manipulative means including a manipulatable member, an index member for indicating the angle of said object with respect to said reference point, and a gear train operatively connecting said manipulatable member with said index member, an escapement mechanism engageable with said gear train to limit the speed of movement of said index member to a predetermined rate of speed less than the speed of relative motion between the object sighted and the reference point, and a clutch for selectively engaging said escapement mechanism with said gear train to thereby limit the speed with which said index member may be operated by said manipulatable member.

20. The invention, as defined in claim 19, wherein a register is operably connected with said gear train for indicating the position of said index member.

21. An observation device adapted for determining the position of an object with reference to a predetermined reference point when relative motion of an oscillatory nature exists between the object and the reference point, said device comprising sighting means for viewing an object, reference means providing a reference point viewable in said sighting means in relation to the object sighted, a manipulatable index member for indicating the angle of said object with respect to said reference point, and selectively operable means for limiting the speed with which said index member may be operated to a speed less than the speed of relative motion between the object sighted and the reference point.

22. The invention as defined in claim 14 wherein said limiting means includes an escapement mechanism.

23. An observation device adapted for determining the position of an object with respect to a predetermined reference point, said device comprising sighting means for viewing an object, reference means providing a reference point viewable in said sighting means in relation to the object sighted, manipulative means for making an observation measurement, said manipulative means including a manipulatable index member for indicating the angle of said object with respect to said reference point, means for limiting the speed of movement of said index member to a predetermined rate of speed less than the speed of relative motion between the objects cited and the reference point, and a clutch for selectively engaging said limiting means with said manipulative means to thereby limit the speed with which said member may be manipulated.

24. An observation instrument for determining the position of an object with respect to a predetermined reference point when relative motion of an oscillatory nature exists between the object and the reference point, said instrument comprising an eyepiece for viewing an object, reference means providing a reference point viewable in said eyepiece, optical means including a rotatable index member for enabling the image of the object and the image of the reference point to be simultaneously viewed in a superimposed relationship through said eyepiece, means for indicating the position of said index member, manipulatable means for rotating said index member, and means for limiting the speed of rotation of said index member to substantially 45 minutes of arc per minute.

25. A sextant adapted for determining the position of an object with respect to a predetermined reference point when relative motion of an oscillatory nature exists between the object and the reference point, said sextant comprising an index mirror, a manipulable means for rotating said index mirror, and an escapement mechanism operatively connected with said manipulable means for limiting the speed of rotation of said index mirror to substantially forty-five minutes of arc per minute.

THOMAS L. THURLOW.